(12) United States Patent
Sato

(10) Patent No.: US 8,045,443 B2
(45) Date of Patent: Oct. 25, 2011

(54) OPTICAL PICKUP APPARATUS

(75) Inventor: Minoru Sato, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 183 days.

(21) Appl. No.: 12/486,653

(22) Filed: Jun. 17, 2009

(65) Prior Publication Data

US 2009/0316562 A1 Dec. 24, 2009

(30) Foreign Application Priority Data

Jun. 20, 2008 (JP) ................................ 2008-162234

(51) Int. Cl.
*G11B 7/00* (2006.01)
(52) U.S. Cl. ............ 369/112.03; 369/53.28; 369/112.05
(58) Field of Classification Search ............. 369/112.03, 369/53.28, 112.05
See application file for complete search history.

(56) References Cited

U.S. PATENT DOCUMENTS

| 7,652,246 B2 * | 1/2010 | Matsubara et al. ....... 250/237 R |
| 2006/0158996 A1 * | 7/2006 | Kim ......................... 369/112.03 |
| 2009/0129235 A1 * | 5/2009 | Yanagisawa et al. ..... 369/112.03 |
| 2009/0147658 A1 * | 6/2009 | Katayama ................. 369/112.03 |

FOREIGN PATENT DOCUMENTS

| JP | 2004-145915 | 5/2004 |
| JP | 2007-149249 | 6/2007 |
| JP | 2007-164962 | 6/2007 |

\* cited by examiner

*Primary Examiner* — Wayne Young
*Assistant Examiner* — Brenda Bernardi
(74) *Attorney, Agent, or Firm* — SoCal IP Law Group LLP; Steven C. Sereboff; John E. Gunther

(57) ABSTRACT

An optical pickup apparatus comprising: a laser-light source that selectively emits first and second laser lights parallel with each other; a diffraction grating that includes a plurality of periodic structures joined to be different in phase from each other in a direction optically corresponding to an optical-disc-tracking direction, and generates 0th-order and ±1st-order-diffracted lights by diffracting the first or second laser light; an objective lens that focuses the 0th-order and ±1st-order-diffracted lights generated from the diffraction grating on the same track of the disc; and a photodetector to which reflected light of the 0th-order and ±1st-order-diffracted lights focused on an optical disc is applied through the objective lens, and which generates a differential-push-pull signal, a direction of a straight line connecting light-emitting points of the first and second laser lights in the laser-light source being inclined relative to the direction optically corresponding to the optical-disc-tracking direction in the diffraction grating.

4 Claims, 4 Drawing Sheets

OPTICAL PICKUP APPARATUS

CROSS-REFERENCE TO RELATED APPLICATION

This application claims the benefit of priority to Japanese Patent Application No. 2008-162234, filed Jun. 20, 2008, of which full contents are incorporated herein by reference.

BACKGROUND OF THE INVENTION

1. Field of the Invention

The present invention relates to an optical pickup apparatus.

2. Description of the Related Art

There is known an optical pickup apparatus including a laser light source that can selectively emit laser light having a wavelength for DVD (Digital Versatile Disc) and laser light having a wavelength for CD (Compact Disc), for example. The laser light source has two light emitting points respectively emitting these two laser lights, with a predetermined space between the points.

This optical pickup apparatus including two types of diffraction gratings that generate 0th order light and ±1st order diffracted lights for generating tracking error signals for each of the two laser lights. Specifically, the two types of the diffraction gratings are assembled so that grating surfaces thereof having different configurations are arranged back to back (See Japanese Patent Laid-Open Publication No. 2007-164962, for example) or assembled so that they are opposed to each other (See Japanese Patent Laid-Open Publication No. 2007-149249, for example).

For example, a diffraction grating provided for laser light having a wavelength for DVD has a configuration for generating the 0th order light and ±1st order diffracted lights suitable for an in-line differential push-pull method by which a tracking error signal is generated, while a diffraction grating provided for laser light having a wavelength for CD has a configuration for generating the 0th order light and ±1st order diffracted lights suitable for a three-beam differential push-pull method by which a tracking error signal is generated (See Japanese Patent Laid-Open Publication No. 2004-145915, for example).

That is, since these two types of the diffraction gratings have the configurations different from each other, they are assembled so that the two grating surfaces are arranged back to back or so that they are opposed to each other as mentioned above, to be incorporated as a single diffraction grating in an optical pickup apparatus for both DVD and CD.

In the above-mentioned optical pickup apparatus, since the laser light having a wavelength for DVD, for example, from the laser light source is applied to both of the above-mentioned diffraction gratings for DVD and CD, the laser light is affected by the diffraction grating for CD.

For example, when performing tracking error control in reproduction, etc., of DVD, in order to generate a differential push-pull signal, it is necessary to diffract the laser light having a wavelength for DVD with the diffraction grating for DVD, to generate the ±1st order diffracted lights (±1st order diffracted lights for DVD). At the same time, the 0th order light is generated from the laser light having a wavelength for DVD by the diffraction grating for DVD, however, the ±1st order diffracted lights (noise) generated by diffracting this 0th order light with the diffraction grating for CD have the same levels in intensity as those of the above-mentioned ±1st order diffracted lights for DVD. This leads to a drop in accuracy of the tracking error signal.

SUMMARY OF THE INVENTION

An optical pickup apparatus according to an aspect of the present invention, comprises: a laser light source configured to selectively emit first laser light having a first wavelength and second laser light having a second wavelength parallel with the first laser light; a diffraction grating including a plurality of periodic structures joined so as to be different in phase from each other in a direction optically corresponding a tracking direction of an optical disc, the diffraction grating configured to generate 0th order light and ±1st order diffracted lights by diffracting the first laser light or the second laser light, each of the plurality of periodic structures including a recess and a projection repeated in a direction optically corresponding to a tangential direction of the optical disc; an objective lens configured to focus the 0th order light and the ±1st order diffracted lights generated from the diffraction grating on the same track of the optical disc; and a photodetector to which reflected light of the 0th order light and the ±1st order diffracted lights focused on the optical disc is applied through the objective lens, the photodetector configured to generate a differential push-pull signal, a direction of a straight line connecting light emitting points of the first laser light and the second laser light in the laser light source being inclined relative to a direction optically corresponding to the tracking direction of the optical disc in the diffraction grating.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

==Configuration of an Optical Pickup Apparatus==

Figure 1:
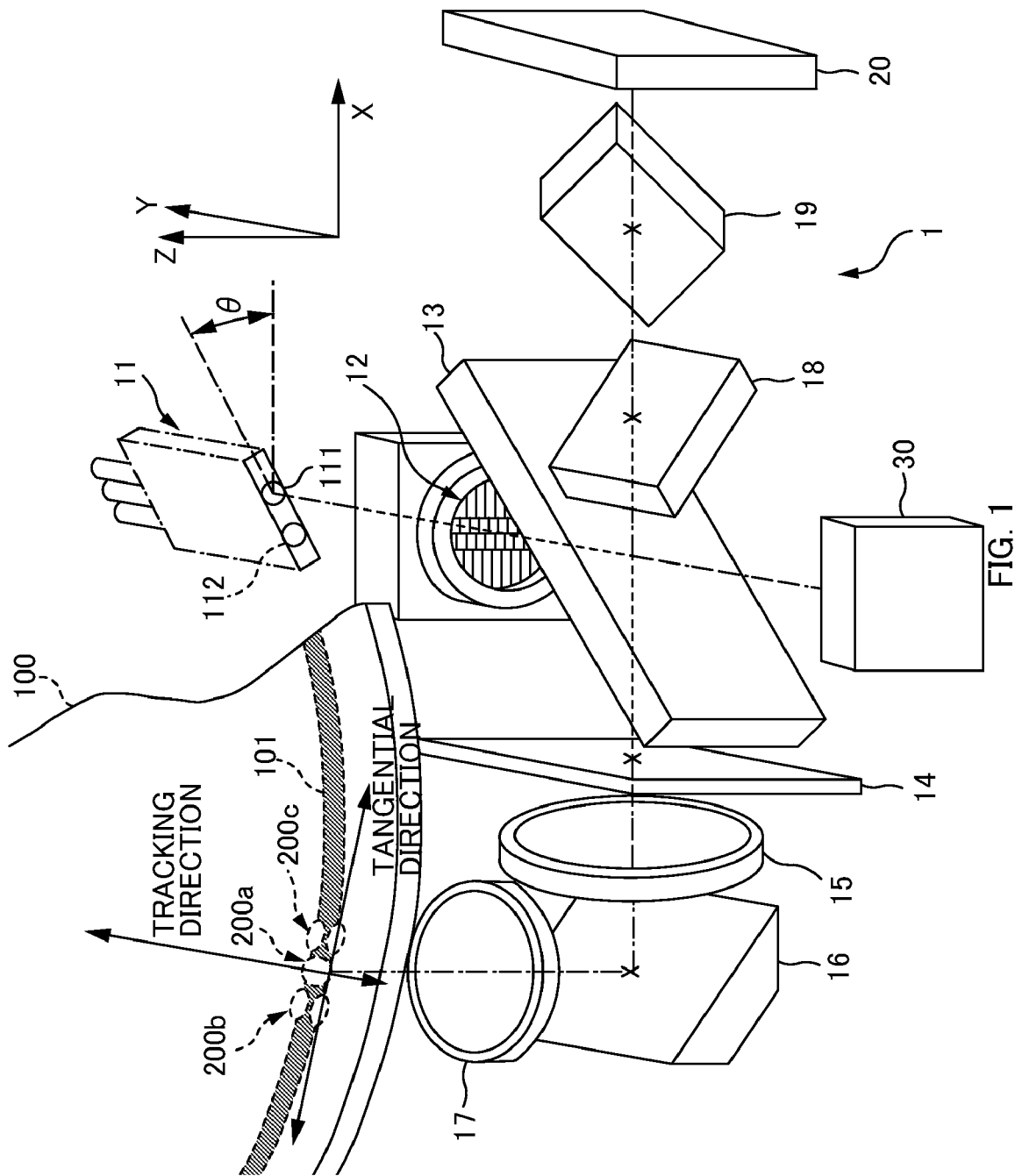
FIG. 1 is a perspective view of an optical pickup apparatus according to an embodiment of the present invention.
Figure 2:
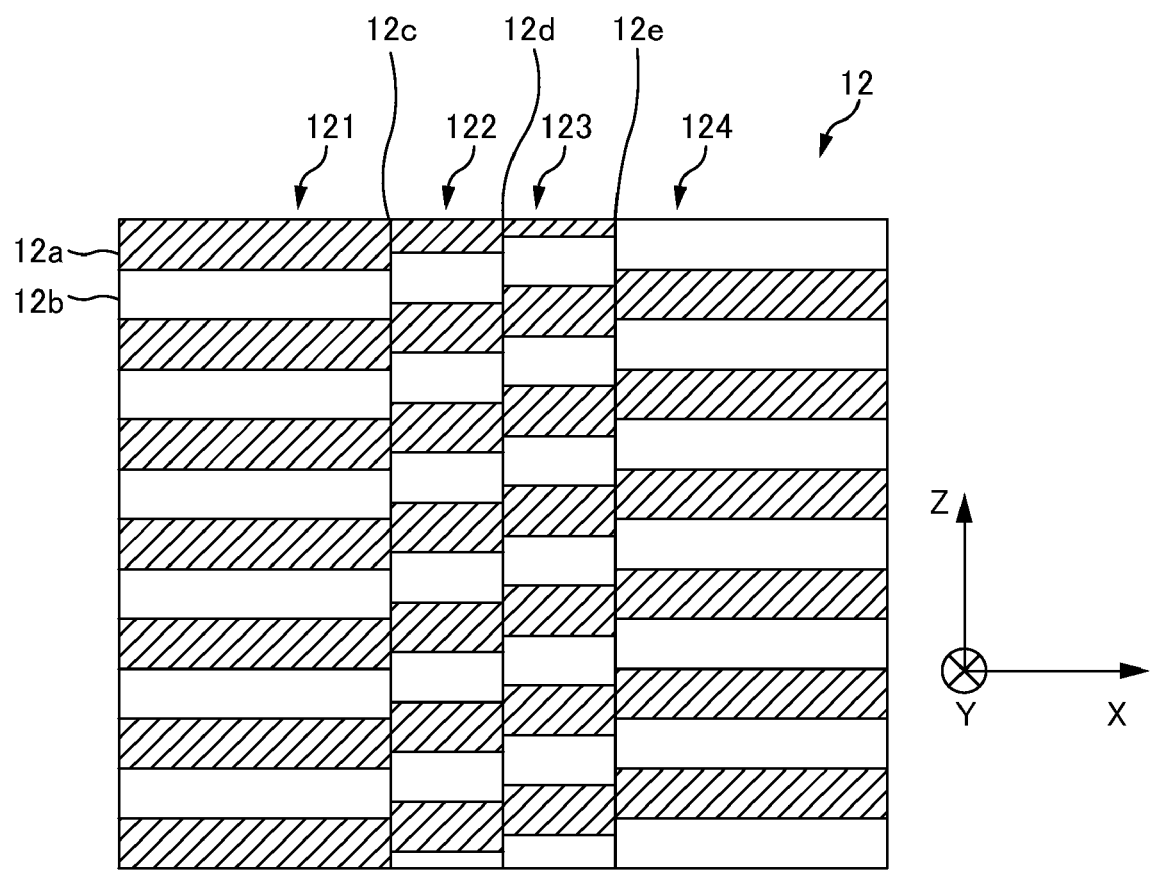
FIG. 2 is a front view of a diffraction grating of an embodiment of the present invention.
Figure 3:
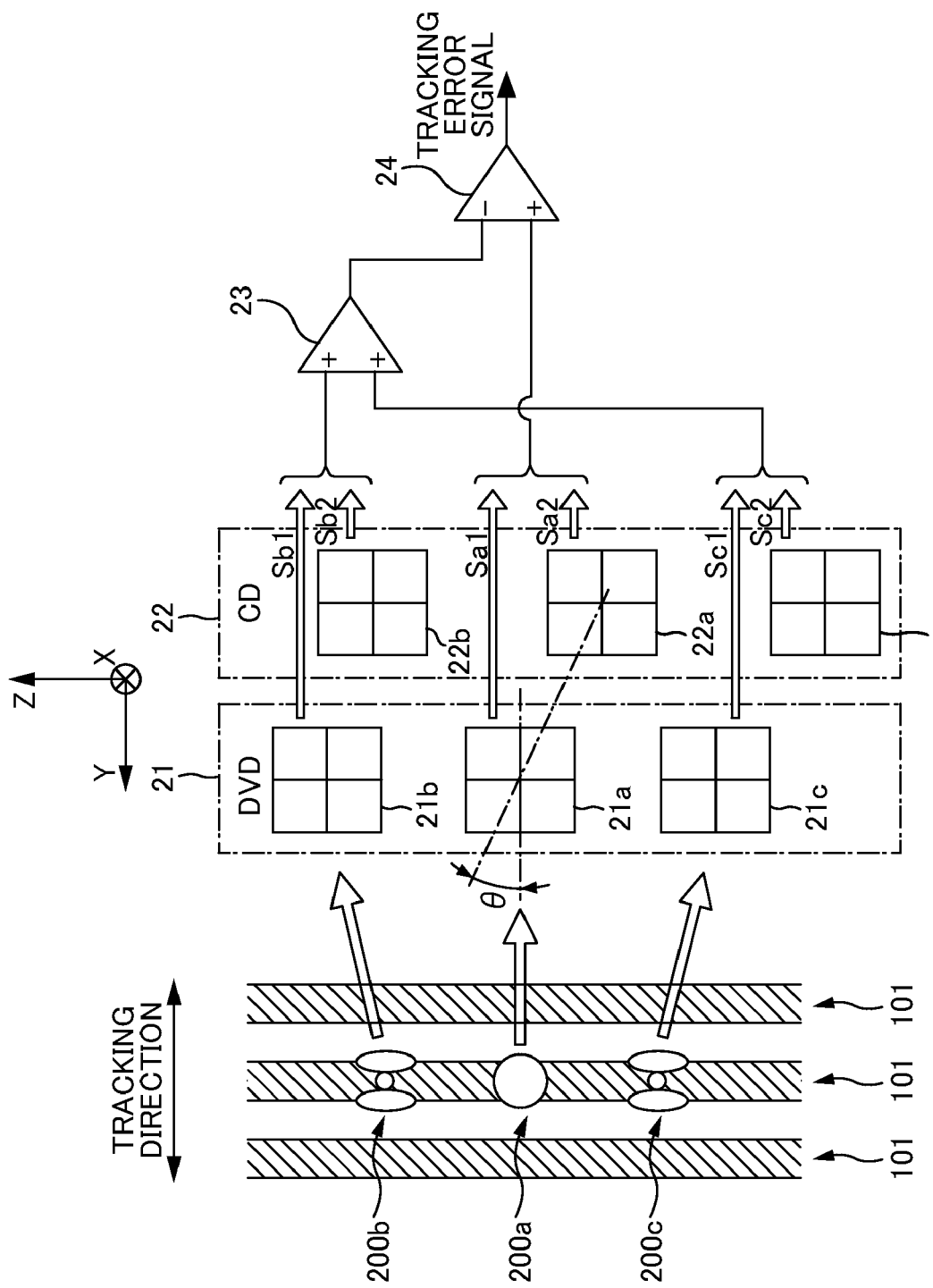
FIG. 3 is a schematic diagram illustrating a configuration example of a photodetector according to an embodiment of the present invention.

Referring to FIGS. 1 to 3, a configuration example of an optical pickup apparatus 1 according to an embodiment of the present invention will be described. FIG. 1 is a perspective view of the optical pickup apparatus 1 according to an embodiment of the present invention. FIG. 2 is a front view of a diffraction grating 12 according to an embodiment of the present invention. FIG. 3 is a schematic diagram illustrating a configuration example of a photodetector 20 according to an embodiment of the present invention.

As exemplified in FIG. 1, the optical pickup apparatus 1 according to an embodiment of the present invention includes a laser light source 11, a diffraction grating 12, a polarizing beam splitter 13, a quarter-wave plate 14, a collimating lens 15, a reflection mirror 16, an objective lens 17, a parallel plate 18, a parallel plate 19, a photodetector 20, and a light-receiving element 30. In the exemplification of the figure, a disc surface of an optical disc 100 mounted on a turntable (not shown) and an XY surface are parallel with each other, and an optical path (including an optical axis, an outward path, and a return path), which will be described below, is also parallel with the XY surface.

The laser light source 11 according to an embodiment of the present invention is a laser diode as a two-wavelength semiconductor laser having a light emitting point 111 for laser light (first laser light) having a wavelength (first wavelength) for DVD, for example, and a light emitting point 112 for laser light (second laser light) having a wavelength (second wavelength) for CD, for example, with a predetermined space therebetween. Here, the wavelength for DVD is approximately 630 to 685 nm, while the wavelength for CD is approximately 765 to 839 nm. As exemplified in FIG. 1, the two light emitting points 111 and 112 are located on the same surface parallel with the XZ surface in the laser light source 1 having a substantially rectangular shape on the outside, for example, and the optical axis of the laser light having a wavelength for DVD emitted from the light emitting point 111 passes through the center of the grating surface of the diffraction grating 12, which will be described below.

The diffraction grating 12 according to an embodiment of the present invention has a configuration for generating the 0th order light and ±1st order diffracted lights only for the in-line differential push-pull method. That is, in the diffraction grating 12, a four-divided grating is formed only on the surface on the −Y side of a transparent substrate (not shown) parallel with the XZ surface, for example. The four-divided diffraction grating which will be described bellow is formed by processing such as etching on the surface of the transparent substrate such as glass.

The diffraction grating 12 includes, as exemplified in FIG. 2, a first region 121 and a fourth region 124 for producing a phase shift of 180 degrees in a part of the laser light incident from the surface on the +Y side. Specifically, the first region 121 in a substantially rectangular shape is formed with a periodic structure including a recess portion 12a and a projecting portion 12b alternately repeated in a Z-axis direction, while the fourth region 124 in a substantially rectangular shape is formed with a periodic structure different in phase by 180 degrees in the Z-axis direction from the periodic structure of the first region 121.

The diffraction grating 12 also includes, as exemplified in FIG. 2, a second region 122 and a third region 123 having smaller widths in an X-axis direction between the first region 121 and the fourth region 124. The periodic structure of the second region 122 is different in phase by 60 degrees from the periodic structure of the first region 121, while the periodic structure of the third region 123 is different in phase by 60 degrees and 120 degrees from the periodic structures of the second region 122 and first region 121, respectively.

As exemplified in FIG. 2, the first region 121 and second region 122 joined at a boundary of a division line 12c, and the third region 123 and fourth region 124 joined at a boundary of a division line 12e, are line-symmetric with respect to a division line 12d in the Z-axis direction dividing the second region 122 and the third region 123. Moreover, as will be described later, the X-axis direction in the diffraction grating 12 optically corresponds to a tracking direction of the optical disc 100, and the Z-axis direction in the diffraction grating 12 optically corresponds to a tangential direction at a position of the optical disc 100, which position is opposed to the objective lens 17.

The polarizing beam splitter 13 according to an embodiment of the present invention reflects the 0th order light and ±1st order diffracted lights from the diffraction grating 12 to enter the quarter-wave plate 14 on the outward path, and allows reflected light from the optical disc 100 to pass therethrough to enter the parallel plate 18 on the return path. Hereinafter, the outward path refers to an optical path from the laser light source 11 toward the optical disc 100, and the return path refers to an optical path from the optical disc 100 toward the photodetector 20.

The quarter-wave plate 14 according to an embodiment of the present invention converts the 0th order light and ±1st order diffracted lights reflected by the polarizing beam splitter 13 from linearly polarized light into circularly polarized light on the outward path, and converts the reflected light from the optical disc 100 from the circularly polarized light to the linearly polarized light on the return path.

By combination of the polarizing beam splitter 13 and the quarter-wave plate 14, a polarization state of light is converted on the outward path and return path, as follows, for example. First, on the outward path, substantially all of the S-polarized light from the diffraction grating 12 is reflected by the beam slitter 13. The reflected S-polarized light is converted by the quarter-wave plate 14 into the right-hand circularly polarized light, for example. Then, on the return path, the right-hand circularly polarized light is reflected by an information recording layer (not shown) of the optical disc 100 to become left-hand circularly polarized light, for example. The left-hand circularly polarized light is converted by the quarter-wave plate 14 to P-polarized light. Substantially all of the P-polarized light passes through the polarizing beam splitter 13.

The collimating lens 15 according to an embodiment of the present invention converts the 0th order light and ±1st order diffracted lights reflected by the polarizing beam splitter 13 into parallel light, to be applied to the objective lens 17 on the onward path, and applies the reflected light from the optical disc 100 to the quarter-wave plate 14 on the return path.

The reflection mirror 16 according to an embodiment of the present invention bends the optical path by 90 degrees, for example, both on the outward path and the return path.

The objective lens 17 according to an embodiment of the present invention focuses the parallel light reflected by the reflection mirror 16, to form micro irradiation spots 200a, 200b, and 200c on a track 101 of the information recording layer of the optical disc, on the outward path; and applies the reflected light from the information recording layer to the reflection mirror 16 on the return path. On an incident surface (surface on the −Z side) of the objective lens 17, a diffraction grating (not shown) for diffracting laser light having a wavelength for the optical disc 100 such as DVD and CD according to each optical characteristic, is formed in an annular shape around the optical axis. By this diffraction grating, spherical aberration of the light from the objective lens 17 is corrected according to the type of the optical disc 100.

As mentioned above, since the diffraction grating 12 has a configuration for generating the 0th order light and ±1st order diffracted lights only for the in-line differential push-pull method, as exemplified in FIG. 1, the irradiation spot 200a formed by irradiation with the 0th order light and the irradiation spots 200b and 200c formed by irradiation with ±1st order diffracted lights are on the same track 101.

The parallel plate 18 according to an embodiment of the present invention corrects astigmatism generated in the light having passed through the polarizing beam splitter 13.

The parallel plate 19 according to an embodiment of the present invention gives astigmatism for providing a focus error component, and corrects coma aberration generated due to the polarizing beam splitter 13 and the parallel plate 18.

The parallel plates 18 and 19 are in a position inclined by a predetermined angle relative to the return path in a predetermined direction in order to perform these functions.

The photodetector 20 according to an embodiment of the present invention receives light from the parallel plate 19, to be output a signal corresponding thereto. On the basis of the signal, a tracking error signal, a focus error signal and the like are generated.

The light-receiving element 30 according to an embodiment of the present invention detects a component having passed through the polarizing beam splitter 13 in the laser light emitted from the laser light source 11, to be output according thereto. On the basis of the signal, there is generated a signal for feedback to the laser light source 11.

<Laser Light Source>

As exemplified in FIG. 1, the above-mentioned laser light source 11 is rotated (that is, inclined) at an angle θ (0 degree<θ<90 degrees) relative to the XY surface about the optical axis of the laser light having a wavelength for DVD emitted from the light emitting point 111 as its center axis. That is, the light emitting point 112 of the laser light having a wavelength for CD is at a distance of cos θ times the predetermined space (the space between the two light emitting points 111 and 112 as mentioned above) in the X-axis direction from the light emitting point 111, and is at a distance of sin θ times the predetermined space in the Z-axis direction from the light emitting point 111.

Similarly, since the diffraction grating 12 is arranged such that the laser light having a wavelength for DVD enters the diffraction grating 12 at the center of the grating surface, the laser light having a wavelength for CD enters the diffraction grating 12 at a position distant from the center of the grating surface by cos θ times the predetermined space in the X-axis direction and by sin θ times the predetermined space in the Z-axis direction.

<Photodetector>

As exemplified in FIG. 3, the photodetector 20 according to an embodiment of the present invention is provided with a light receiving region 21 for DVD and a light receiving region 22 for CD on a detection surface on the −X side of the photodetector 20. The two light receiving regions 21 and 22 are arranged with a space therebetween in the Y-axis direction on the detection surface of the photodetector 20 as well, corresponding to the space between the two light emitting points 111 and 112 of the laser light source 11.

The light receiving region 21 for DVD includes a main light receiving portion 21a, and a sub light receiving portion 21b and a sub light receiving portion 21c that are arranged across the main light receiving portion 21a in the Z-axis direction so that the main light receiving portion is positioned in the center. The main light receiving portion 21a, the sub light receiving portion 21b, and the sub light receiving portion 21c respectively correspond to the substantially circular irradiation spot 200a, the oval irradiation spot 200b, and irradiation spot 200c on the same track 101 of the optical disc 100, which are respectively formed by irradiation with the 0th order light and the ±1st order diffracted lights. Each of the light receiving portions 21a, 21b, and 21c has a substantially square shape on the outside, which is further divided into four substantially square shaped segments. In the exemplification in FIG. 3, the space between the main light receiving portion 21a and the sub light receiving portion 21b in the Z-axis direction is equal to the space between the main light receiving portion 21a and the sub light receiving portion 21c in the same direction.

The light receiving region 22 for CD includes a main light receiving portion 22a, and a sub light receiving portion 22b and a sub light receiving portion 22c that are arranged across the main light receiving portion 22a in the Z-axis direction so that the main light receiving portion is positioned in the center. The main light receiving portion 22a, the sub light receiving portion 22b, and the sub light receiving portion 22c respectively correspond to the substantially circular irradiation spot 200a, the oval irradiation spot 200b, and the irradiation spot 200c formed on the same track 101 of the optical disc 100, which are respectively formed by irradiation with the 0th order light and the ±1st order diffracted lights. Each of the light receiving portions 22a, 22b, and 22c has a substantially square shape on the outside, which is further divided into four substantially square shaped segments. In the exemplification in FIG. 3, the space between the main light receiving portion 22a and the sub light receiving portion 22b in the Z-axis direction is equal to the space between the main light receiving portion 22a and the sub light receiving portion 22c in the same direction.

Moreover, in the exemplification in FIG. 3, the light receiving region 21 for DVD and the light receiving region 22 for CD are arranged from each other such that a straight line connecting the center point of the main light receiving portion 21a and the center point of the main light receiving portion 22a forms an angle θ of inclination of the above laser light source 11 relative to the Y-axis. Furthermore, in the exemplification in the same figure, the relative ratio between the space between the main light receiving portion 21a and the sub light receiving portions 21b and 21c, and the space between the main light receiving portion 22a and the sub light receiving portions 22b, 22c is set according to the relative ratio between the wavelength for DVD and the wavelength for CD, for example. As an example, the space between the main light receiving portion 22a and the sub light receiving portions 22b and 22c for CD is set greater than the space between the main light receiving portion 21a and the sub light receiving portions 21b and 21c for DVD.

With an arrangement as above, even if the laser light having a wavelength for CD is diffracted by the diffraction grating 12 for use with DVD to obtain the 0th order light and ±1st order diffracted lights, the reflected lights obtained by reflecting these lights by the optical disc 100 can efficiently be received at the light receiving region 22 for CD.

Push-pull signals Sa1, Sb1, and Sc1 are obtained respectively in the light receiving portions 21a, 21b, and 21c of the above-configured light receiving region 21 for DVD in such a manner that a predetermined arithmetical operation is performed for four signals output from their respective four segments receiving light in each of the light receiving portions 21a, 21b, and 21c. Similarly, push-pull signals Sa2, Sb2, and Sc2 are obtained respectively in the light receiving portions 22a, 22b, and 22c of the light receiving region 22 for CD in such a manner that a predetermined arithmetical operation is performed for four signals output from their respective four segments receiving light in each of the light receiving portions 22a, 22b, and 22c. In FIG. 3, how to perform the predetermined arithmetical operation for the signals from the segments is omitted for convenience in illustrating.

The push-pull signal Sa1 and the push-pull signal Sb1 are in reverse phase with each other, and the push-pull signal Sa1 and the push-pull signal Sc1 are also in reverse phase with each other. Similarly, the push-pull signal Sa2 and the push-pull signal Sb2 are in reverse phase with each other, and the push-pull signal Sa2 and the push-pull signal Sc2 are also in reverse phase with each other.

Then, in reproduction, etc., of DVD or CD, subtraction processing is performed by a subtractor 24 for a signal ((Sb1+Sc1) or (Sb2+Sc2)) obtained by performing addition processing for the push-pull signals from the two sub light receiving portions by an adder 23, and the push-pull signal (Sa1 or Sa2) from the main light receiving portion, so as to obtain a differential push-pull signal, so that a tracking error signal in which an offset component is canceled can be generated.

==Operation of the Optical Pickup Apparatus==

Figure 4:
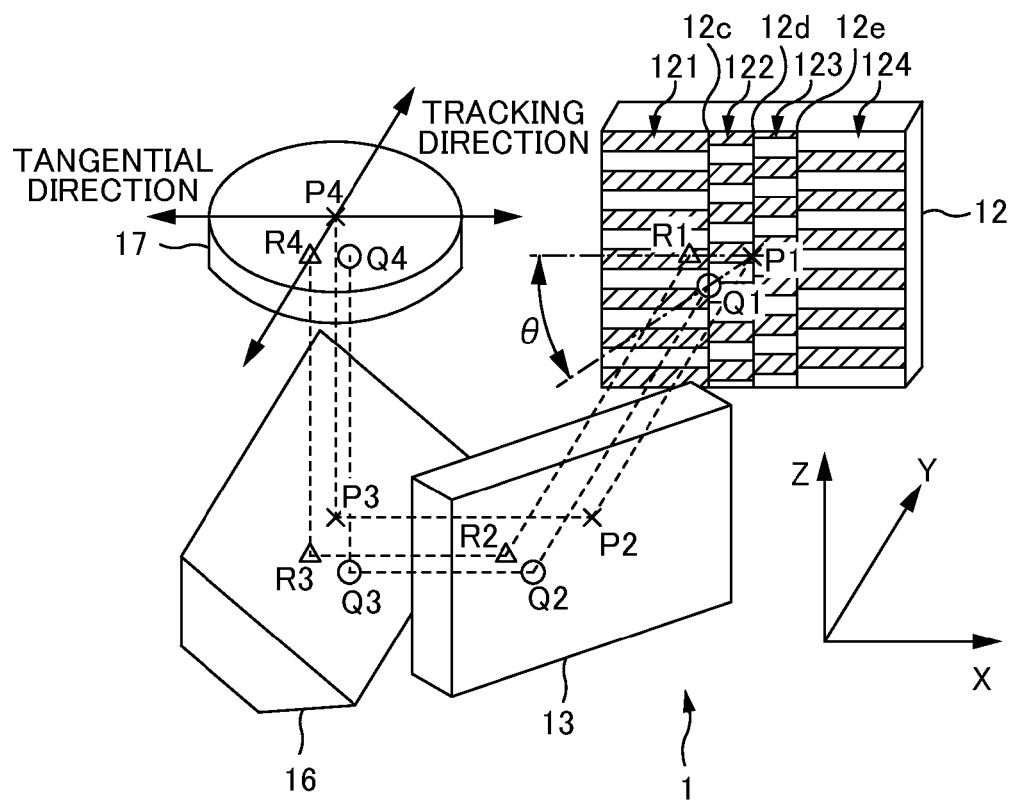
FIG. 4 is a perspective view illustrating an example of an optical path from a diffraction grating to an objective lens.
Figure 5:
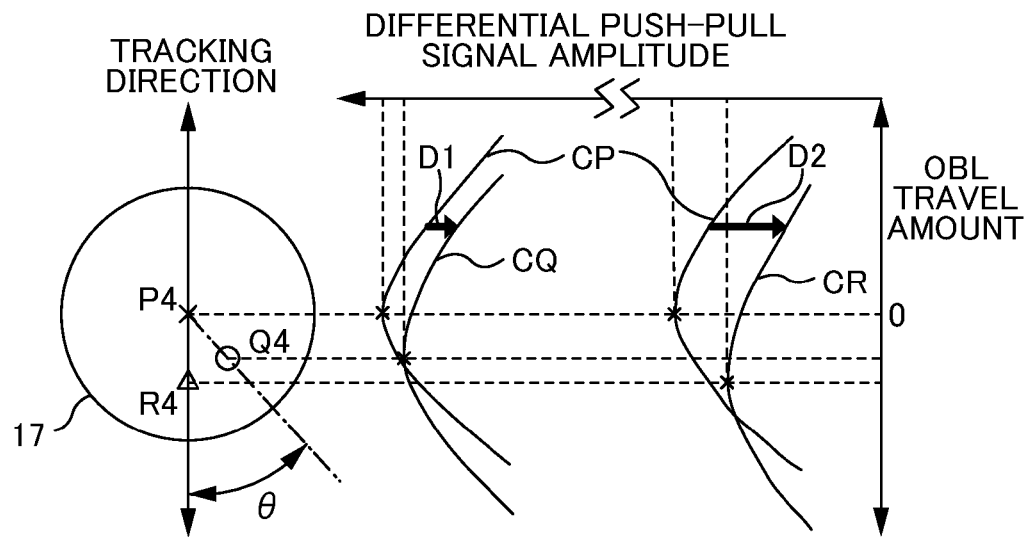
FIG. 5 is a schematic diagram illustrating an example of a relationship between a position of an intensity center point of light incident on an objective lens and lens-travel characteristics of the amplitude of a differential push-pull signal (Dpp).

There will be described an operation example of the optical pickup apparatus 1 including the above-mentioned configuration with reference to FIGS. 4 and 5. FIG. 4 is a perspective view illustrating an example of the optical path from the diffraction grating 12 to the objective lens 17. In this figure, the quarter-wave plate 14 and the collimating lens 15, which should be located between the polarizing beam splitter 13 and the reflection mirror 16, are omitted for convenience in illustrating. FIG. 5 is a schematic diagram illustrating an example of a relationship between the position of the intensity center point of the light incident on the objective lens 17 and the lens-travel characteristics of the amplitude of the differential push-pull signal (Dpp).

<Laser Light Source Inclined at the Angle θ>

As exemplified in FIG. 4, the intensity center point P1 of the laser light having a wavelength for DVD is located at the center on the grating surface of the diffraction grating 12 in the X-axis direction. That is, the intensity center point P1 corresponding to DVD is located on the division line 12d.

Also, as mentioned above, in the laser light source 11 arranged in the rear of the diffraction grating 12 in FIG. 4, the optical axis of the laser light having a wavelength for CD is rotated (that is, inclined) at the angle θ to the −Z side about the optical axis of the laser light having a wavelength for DVD. Thus, an intensity center point Q1 corresponding to CD is located at a position deviated from the intensity center point P1 to the −X side and the −Z side.

The laser light having a wavelength for DVD travels from the intensity center point P1 on the division line 12d of the diffraction grating 12 through an intensity center point P2 formed on the polarizing beam splitter 13 and an intensity center point P3 formed on the reflection mirror 16 to the center point on the incident surface (surface on the −Z side) of the objective lens 17, and an intensity center P4 is formed at this center point.

Similarly, the laser light having a wavelength for CD travels from the intensity center point Q1, which is deviated from the division line 12d to the −X side and is deviated to the −Z side on the diffraction grating 12, through an intensity center point Q2 formed on the polarizing beam splitter 13 and an intensity center point Q3 formed on the reflection mirror 16, to a position which is deviated in the tracking direction and the tangential direction from the center point on the incident surface (surface on the −Z side) of the objective lens 17, and an intensity center Q4 is formed at this point.

As is known from FIG. 4, the tracking direction, in which the objective lens 17 is caused to travel when the tracking control is performed, optically corresponds to a direction (X-axis direction) perpendicular to the division lines 12c, 12d, and 12e on the grating surface of the division-type diffraction grating 12. Moreover, the direction of the division lines 12c, 12d, and 12e (Z-axis direction) optically corresponds to the tangential direction at the position of the optical disc 100, which position is opposed to the objective lens 17.

<Non-inclined Laser Light Source>

As exemplified in FIG. 4, if the laser light source 11 is not inclined as mentioned above, an intensity center point R1 corresponding to CD is located on the grating surface so that the space between P1 and R1 is substantially equal to the predetermined space between the two light emitting points 111 and 112 and a straight line connecting P1 and R1 is parallel with the X-axis direction.

The laser light having a wavelength for CD travels from the intensity center point R1 located at a position deviated from the division line 12d to the −X side on the diffraction grating 12 through an intensity center point R2 formed on the polarizing beam splitter 13 and an intensity center point R3 formed on the reflection mirror 16 to a position deviated in the tracking direction from the center point on the incident surface (surface on the −Z side) of the objective lens 17, and an intensity center R4 is formed at this point.

<Comparison Between Inclined Case and Non-inclined Case>

The above-mentioned three intensity centers P1, Q1, R1 in the grating surface of the diffraction grating 12 are in the following positional relationship. That is, the intensity center Q1 corresponding to CD when the laser light source 11 is inclined (an embodiment of the present invention) is obtained such that the intensity center R1 corresponding to CD when the light source is not inclined is rotated (that is, inclined) at the angle θ in the counterclockwise direction in FIG. 4 about the intensity center P1 corresponding to DVD.

As a result, in the grating surface of the diffraction grating 12, the intensity center point Q1 corresponding to CD is closer in the X-axis direction (corresponding to the tracking direction) to the intensity center point P1 corresponding to DVD than the intensity center point R1 corresponding to CD by a distance of (1−cos θ) times the predetermined space between the two light emitting points 111 and 112.

Accordingly, in the incident surface (surface on the −Z side) of the objective lens 17, the intensity center point Q4 corresponding to CD is closer in the tracking direction to the intensity center point P4 (center of the objective lens 17) corresponding to DVD than the intensity center point R4 corresponding to CD by the distance according to the predetermined space between the two light emitting points 111 and 112.

As is exemplified in FIG. 5, in a visual field characteristic curve CP indicating a degree of deterioration of the amplitude of the Dpp signal relative to a travel amount in the tracking direction of the objective lens 17 in reproduction, etc., of DVD, there is a tendency of the amplitude of the Dpp signal to gradually decrease in a substantially symmetrical manner on the travel amount±side with respect to zero at which the amplitude of the Dpp signal has the maximum value, for example. This is based on the premise that the irradiation spots 200a, 200b, and 200c are formed in optimal positions in the same track 101 of the optical disc 100 when the travel amount of the objective lens 17 is zero.

According to the optical pickup apparatus 1 of an embodiment of the present invention, in the grating surface of the diffraction grating 12, the intensity center point Q1 is closer to the division line 12d in a direction optically corresponding to the tracking direction than the intensity center point R1 by the distance of (1−cos θ) times the above-mentioned predetermined space. Here, the closer the intensity center point of the laser light is in the direction optically corresponding to the tracking direction in the diffraction grating 12, the higher the phase symmetry of the generated ±1st order diffracted lights becomes, and thus, the visual field characteristics relating to the Dpp signal is also improved. Therefore, the maximum value of a visual field characteristic curve CQ corresponding to the intensity center point Q1 becomes greater than the maximum value of the visual field characteristic curve CR corresponding to the intensity center point R1.

CQ is the visual field characteristic curve indicating a degree of deterioration of the amplitude of the Dpp signal relative to the travel amount in the tracking direction of the objective lens 17 in reproduction, etc., of CD when the laser light source 11 is inclined (an embodiment of the present invention), while CR is the visual field characteristic curve indicating a degree of deterioration of the amplitude of the Dpp signal relative to the travel amount in the tracking direction of the objective lens 17 in reproduction, etc., of CD when the laser light source 11 is not inclined.

Moreover, according to the optical pickup apparatus 1 of an embodiment of the invention, in the incident surface (surface on the −Z side) of the objective lens 17, the intensity center point Q4 is closer in the tracking direction to the center of the objective lens 17 than the intensity center point R4 by the distance according to the above-mentioned predetermined space. Thus, when the amplitude of the Dpp signal relative to the same travel amount of the objective lens 17 is compared, the relationship the amplitude of Dpp of CR<the amplitude of Dpp of CQ<the amplitude of Dpp of Cp can be obtained. As exemplified in FIG. 5, at a certain travel amount, a difference in amplitude between the visual field characteristic lines CP and CR is D2 if the laser light source 11 is not inclined, while a difference in amplitude between the visual field characteristic lines CP and CQ is D1 smaller than D2 if the laser light source 11 is inclined (an embodiment according to the present invention).

Furthermore, according to the optical pickup apparatus 1 of an embodiment of the present invention, since the optical axis of the light relating to DVD out of the laser lights emitted from the two light emitting points 111 and 112 is aligned with the center in the X-axis direction (direction optically corresponding to the tracking direction of the optical disc 100) in the diffraction grating 12, the visual field characteristics relating to the Dpp signal in the CD can be improved by adjusting the inclination angle θ while the visual field characteristics relating to the Dpp signal in the DVD is maintained in an optimal state.

From the above, according to the optical pickup apparatus 1 of an embodiment of the preset invention, even if the optical path of the laser light having a wavelength for DVD is aligned with the center of the diffraction grating 12 and the center of objective lens 17, for example, the degree of deterioration of the visual field characteristics in reproduction, etc., of CD with use of the laser light having a wavelength for CD, for example, can be restrained, and thus, the tracking error signal is improved in accuracy both for DVD and CD.

<Improvement in Accuracy of the Tracking Error Signal>

The optical pickup apparatus 1 of an embodiment of the present invention may at least include: the laser light source 11 configured to selectively emit the laser light having a wavelength for DVD, for example, and the laser light having a wavelength for CD, for example, which is parallel with the laser light having a wavelength for DVD; the diffraction grating 12 including a plurality of periodic structures joined so as to be different in phase from each other in the direction optically corresponding to the tracking direction of the optical disc 100, configured to generate the 0th order light and ±1st order diffracted lights by diffracting the laser light, each of the plurality of periodic structures including a recess portion and a projection repeated in the direction optically corresponding to the tangential direction of the optical disc 100; the objective lens 17 configured to focus the 0th order light and ±1st order diffracted lights generated from the diffraction grating 12 on the same track 101 of the optical disc 100; and the photodetector 20 to which the reflected lights of the 0th order light and ±1st order diffracted lights focused on the optical disc 100 is applied through the objective lens 17, configured to generate a differential push-pull signal, and a direction of a straight line connecting the light emitting points 111 and 112 of the two laser lights in the laser light source 11 may be inclined relative to the direction optically corresponding to the tracking direction in the diffraction grating 12.

According to the optical pickup apparatus 1, the distance between the two intensity centers of the two laser lights in the diffraction grating 12 in the direction (X-axis direction) optically corresponding to the tracking direction of the optical disc 100 when the laser light source 11 is inclined, becomes shorter than the distance when the light source 11 is not inclined. Similarly, the distance between the two intensity centers of the two laser lights in the objective lens 17 in the tracking direction when the laser light source 11 is inclined, becomes shorter than the distance when the light source 11 is not inclined. As the intensity center point of the laser light is made closer in the X-axis direction to the center position of the grating surface of the diffraction grating 12, the phase symmetry of the generated ±1st order diffracted lights also becomes higher, and thus, the visual field characteristics relating to the Dpp signal is improved. Similarly, as the intensity center point of the laser light is made closer in the tracking direction to the center position of the objective lens 17, the visual field characteristics relating to the Dpp signal is more improved. Therefore, by arranging the laser light source 11 with such an inclination of a predetermined angle that each of the center positions of the diffraction grating 12 and the objective lens 17 is positioned between the two intensity centers, the visual field characteristics relating to the Dpp signal can be improved for both of the two laser lights, as compared with in the case where the laser light source 11 is not inclined. Accordingly, the accuracy of the tracking error signal is improved for the both of the two laser lights.

Moreover, in the optical pickup apparatus 1 as above, either one of the two laser lights preferably enters the diffraction grating 12 at the center in the direction (X-axis direction) optically corresponding to the tracking direction of the optical disc 100.

According to the optical pickup apparatus 1, since the optical axis of one of the two lights emitted from the two light emitting points 111 and 112 is aligned with the center in the diffraction grating 12 in the X-axis direction, the visual field characteristics relating to the Dpp signal in the one is maintained in an optimal state, while the visual characteristics relating to the Dpp signal in the other one can be improved by adjusting the inclination angle θ.

Furthermore, in the optical pickup apparatus 1 as above, the one of the laser lights preferably enters the diffraction grating 12 at the center in the direction (Z-axis direction) optically corresponding to the tangential direction of the optical disc 100 as well.

According to the optical pickup apparatus 1, since the optical axis of the one is further aligned with the center in the diffraction grating 12 in the Z-axis direction, the spot of the one of the laser lights on the diffraction grating 12 can be positioned within the grating surface.

In the optical pickup apparatus 1 as above, the laser light emitted from the light emitting point 111 preferably has a wavelength shorter than that of the laser light emitted from the light emitting point 112, and enters the diffraction grating 12 at the center in the direction (X-axis direction) optically corresponding to the tracking direction of the optical disc 100 and at the center in the direction (Z-axis direction) optically corresponding to the tangential direction of the optical disc 100.

The shorter the wavelength of the laser light is, the higher the recording density of the optical disc 100 using this laser light can be made. By making the optical axis of such a laser light be aligned with the center of the grating surface of the diffracting grating 12, the visual field characteristics relating to the Dpp signal can be maintained in an optimal state for the optical disc 100 with higher recording density.

Other Embodiments

The above embodiments of the present invention are simply for facilitating the understanding of the present invention and are not in any way to be construed as limiting the present invention. The present invention may variously be changed or altered without departing from its spirit and encompass equivalents thereof.

In an embodiment as mentioned above, the two types of laser lights are the laser light having a wavelength for DVD and the laser light having a wavelength for CD, however, this is not limitative. The two laser lights may be of any type as long as they have wavelengths different from each other and optical axes parallel with each other.

In an embodiment as mentioned above, the optical path of the laser light having a wavelength for DVD is aligned with the center of the diffraction grating 12 and the center of the objective lens 17, however, this is not limitative. The optical path of the laser light having the wavelength for CD, for example, may be aligned with the center of the diffraction grating 12 and the center of the objective lens 17.

In an embodiment as mentioned above, the laser light source 11 is inclined at the angle θ (0 degree<θ<90 degrees) on the −Z side relative to the XY surface about the light emitting point 111, however, this is not limitative. For example, the laser light source 11 may be inclined at the angle θ on the +Z side. An angle of about 30 to 60 degrees is preferable as the angle θ, in order to arrange the light receiving region 21 for DVD and the light receiving region 22 for CD with an appropriate space to efficiently receive the reflected light form the optical disc and to obtain an optical spot shape (caused by a far field of the laser light of the laser diode) to improve signal reading performance on the signal track of the optical disc after the visual field characteristics are improved.

In an embodiment as mentioned above, although the diffraction grating 12 is a four-divided type, it is not limitative. The number of divisions in the diffraction grating 12 may be any integer equal to or more than 2. That is, the diffraction grating 12 has only to have a configuration for generating the 0th order light and ±1st order diffracted lights suitable for the in-line differential push-pull method. In the case of the diffraction grating 12 of an odd number division type, there is no such a substantial line as the above-mentioned division line 12*d* at the center of the grating surface in the X-axis direction (direction optically corresponding to the tracking direction of the optical disc 100). In this case, the optical axis of the laser light emitted from the light emitting point 111 has only to be aligned with the center position in the X-axis direction in a periodic structure of the same phase located at the center part of grating surface.

In an embodiment as mentioned above, the grating surface of the diffraction grating 12 is formed only on the surface on the −Y side of the transparent substrate (not shown) parallel with the XZ surface, however, it is not limitative, and it may be formed only on the surface on the +Y side, for example.

In an embodiment as mentioned above, the quarter-wave plate 14 and the collimating lens 15 are arranged in this order on the outward path, however, it is not limitative. They may be arranged in the opposite order, for example.

What is claimed is:

1. An optical pickup apparatus comprising:
    a laser light source including a first light emitting point from which first laser light having a first wavelength is emitted and a second light emitting point from which second laser light having a second wavelength parallel with the first laser light is emitted, the laser light source configured to selectively emit one of the first and second laser lights from the first and second light emitting points respectively;
    a diffraction grating including a plurality of periodic structures joined so as to be different in phase from each other in a direction optically corresponding to a tracking direction of an optical disc, the diffraction grating configured to generate 0th order light and ±1st order diffracted lights by diffracting the first laser light or the second laser light, each of the plurality of periodic structures including a recess and a projection repeated in a direction optically corresponding to a tangential direction of the optical disc;
    an objective lens configured to focus the 0th order light and the ±1st order diffracted lights generated from the diffraction grating on the same track of the optical disc; and
    a photodetector to which reflected light of the 0th order light and the ±1st order diffracted lights focused on the optical disc is applied through the objective lens, the photodetector configured to generate a differential push-pull signal, the photodetector including:
        a first light receiving region configured to receive reflected light of the first laser light from the optical disc, and
        a second light receiving region configured to receive reflected light of the second laser light from the optical disc,
        the first and second light receiving regions arranged with a space therebetween corresponding to the first and second light emitting points of the laser light source,
    a direction of a straight line connecting the first and second light emitting points of the laser light source being inclined relative to the direction optically corresponding to the tracking direction of the optical disc in the diffraction grating.

2. The optical pickup apparatus according to claim 1, wherein
    either the first laser light or the second laser light enters the diffraction grating at substantially the center in a direction optically corresponding to the tracking direction of the optical disc.

3. The optical pickup apparatus according to claim 2, wherein
    either the first laser light or the second laser light enters the diffraction grating at substantially the center in a direction optically corresponding to the tangential direction of the optical disc.

4. The optical pickup apparatus according to claim 3, wherein
    the first wavelength is shorter than the second wavelength, and wherein
    the first laser light enters the diffraction grating at substantially the center in the direction optically corresponding to the tracking direction of the optical disc and at substantially the center in the direction optically corresponding to the tangential direction of the optical disc.

* * * * *